US008876409B2

(12) United States Patent
Ohara

(10) Patent No.: US 8,876,409 B2
(45) Date of Patent: Nov. 4, 2014

(54) OPTICAL DEVICE

(75) Inventor: Satoshi Ohara, Hachioji (JP)

(73) Assignee: Olympus Corporation, Tokyo (JP)

( * ) Notice: Subject to any disclaimer, the term of this patent is extended or adjusted under 35 U.S.C. 154(b) by 416 days.

(21) Appl. No.: 13/051,099

(22) Filed: Mar. 18, 2011

(65) Prior Publication Data

US 2011/0243510 A1     Oct. 6, 2011

(30) Foreign Application Priority Data

Apr. 6, 2010    (JP) ................................. 2010-088064

(51) Int. Cl.
| | |
|---|---|
| G02B 6/42 | (2006.01) |
| G02B 6/00 | (2006.01) |
| G02B 6/06 | (2006.01) |
| G02B 6/44 | (2006.01) |
| G02B 6/36 | (2006.01) |
| F21V 19/00 | (2006.01) |
| F21V 21/00 | (2006.01) |
| C09J 1/00 | (2006.01) |
| F21V 8/00 | (2006.01) |
| G02B 6/26 | (2006.01) |

(52) U.S. Cl.
CPC .............. G02B 6/0003 (2013.01); G02B 6/262 (2013.01); G02B 6/0008 (2013.01)
USPC ............................................. 385/88; 385/84

(58) Field of Classification Search
CPC .............. G02B 6/42; G02B 6/06; G02B 6/44; G02B 6/36; F21V 19/00; F21V 21/00; C09J 1/00
USPC ...................................... 385/84, 88
See application file for complete search history.

(56) References Cited

U.S. PATENT DOCUMENTS

| | | | | |
|---|---|---|---|---|
| 4,475,032 A | * | 10/1984 | Popma et al. | ............ 250/214 VT |
| 4,560,286 A | * | 12/1985 | Wickersheim | ................ 374/131 |
| 8,186,864 B2 | * | 5/2012 | Komazaki et al. | ............ 362/572 |

(Continued)

FOREIGN PATENT DOCUMENTS

| | | |
|---|---|---|
| JP | 63-19609 A | 1/1988 |
| JP | 8-129118 A | 5/1996 |
| JP | 2008-76798 A | 4/2008 |
| JP | 2008-116553 A | 5/2008 |

OTHER PUBLICATIONS

Japanese Office Action dated Aug. 6, 2013 from related Japanese Patent Application No. 2010-088064, together with an English language translation.

*Primary Examiner* — Kaveh Kianni
(74) *Attorney, Agent, or Firm* — Scully, Scott, Murphy & Presser, P.C.

(57) ABSTRACT

An optical device includes a light guide member, a holding member to hold the light guide member, an optical element to function according to light applied from the light guide member, a holder to hold the optical element, and an adhesive to join the holding member to the holder. The holding member and the holder are engaged with each other so that the optical element is placed on an optical axis of the light guide member. At least one of the holding member and the holder has a joint structure extending along the light guide member. The joint structure forms a gap to allow the adhesive to be easily injected between the holding member and the holder. The holding member and the holder are joined to each other with the adhesive injected into the gap.

12 Claims, 5 Drawing Sheets

(56) References Cited

U.S. PATENT DOCUMENTS

| | | | |
|---|---|---|---|
| 2002/0074086 A1* | 6/2002 | Nakamura et al. | 156/329 |
| 2003/0040596 A1* | 2/2003 | Nakamura et al. | 528/10 |
| 2005/0226566 A1* | 10/2005 | Sasaki et al. | 385/55 |
| 2006/0274998 A1* | 12/2006 | Ito et al. | 385/92 |
| 2007/0195538 A1* | 8/2007 | Hama et al. | 362/382 |
| 2008/0019642 A1* | 1/2008 | Kewitsch | 385/72 |
| 2008/0069504 A1* | 3/2008 | Hiraga et al. | 385/106 |
| 2010/0314986 A1* | 12/2010 | Gershaw | 313/46 |

* cited by examiner

OPTICAL DEVICE

CROSS-REFERENCE TO RELATED APPLICATIONS

This application is based upon and claims the benefit of priority from prior Japanese Patent Application No. 2010-068064, filed Apr. 6, 2010, the entire contents of which are incorporated herein by reference.

BACKGROUND OF THE INVENTION

1. Field of the Invention

The present invention relates to an optical device.

2. Description of the Related Art

US Patent Application Publication US 2007/0195538 A1 discloses an optical device formed by joining an optical fiber holding member (a ferrule and a flange) to hold an optical fiber and a light conversion member holding member (cap) to hold a light conversion member. In this optical device, a joint of the optical fiber holding member and the light conversion member holding member is performed by YAG-welding the end faces of the flange and cap to each other, which face each other parallel on a plane perpendicular to the optical axis of the optical fiber.

In the optical device according to the prior art, both the joint surfaces of the optical fiber holding member and light conversion member holding member are parallel to a plane perpendicular to the optical axis of the optical fiber. For this reason, reducing the diameter of the optical device will greatly reduce the joint strength because of a reduction in joint area. This may fail to secure a joint strength required for the device. This is the problem that arises regardless of the joining method to be used. Joining with a general adhesive, in particular, is inferior in joint strength to joining by welding, and thus this problem is more noticeable.

BRIEF SUMMARY OF THE INVENTION

An object is to provide an optical device that may secure a joint strength required for the device even if the diameter is reduced.

Such an optical device includes a light guide member, a holding member to hold the light guide member, an optical element to function according to light applied from the light guide member, a holder to hold the optical element, and an adhesive to join the holding member to the holder. The holding member and the holder are engaged with each other so that the optical element is placed on an optical axis of the light guide member. At least one of the holding member and the holder has a joint structure extending along the light guide member. The joint structure forms a gap to allow the adhesive to be easily injected between the holding member and the holder. The holding member and the holder are joined to each other with the adhesive injected into the gap.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the present invention will be described below with reference to the views of the accompanying drawing.

First Embodiment

Figure 1:
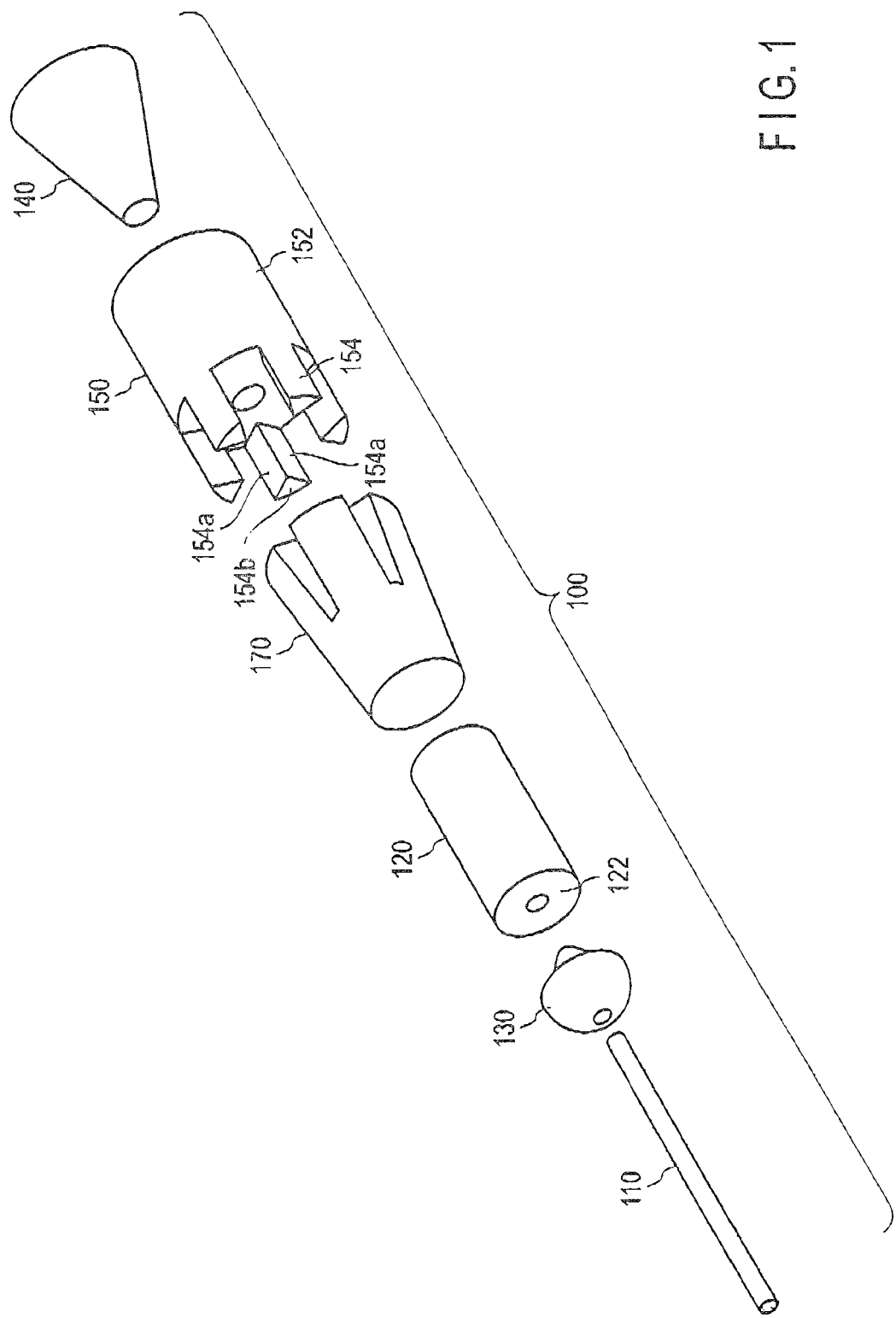
FIG. 1 is an exploded perspective view of an optical device according to the first embodiment.
Figure 2:
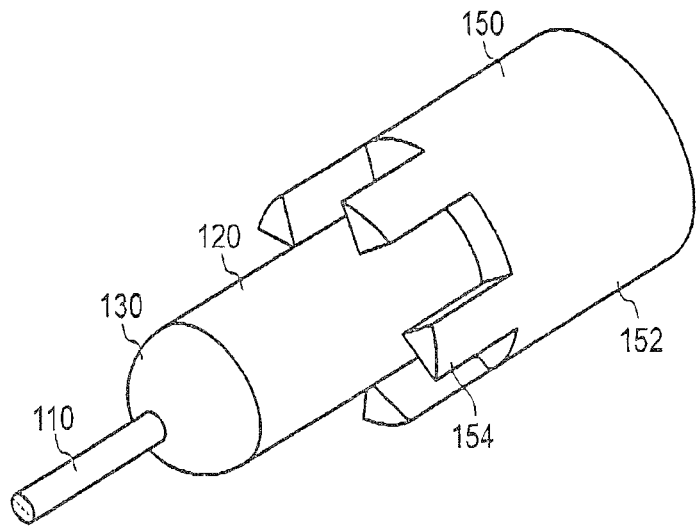
FIG. 2 is a perspective view of the optical device shown in FIG. 1 before being coated with an adhesive.
Figure 3:
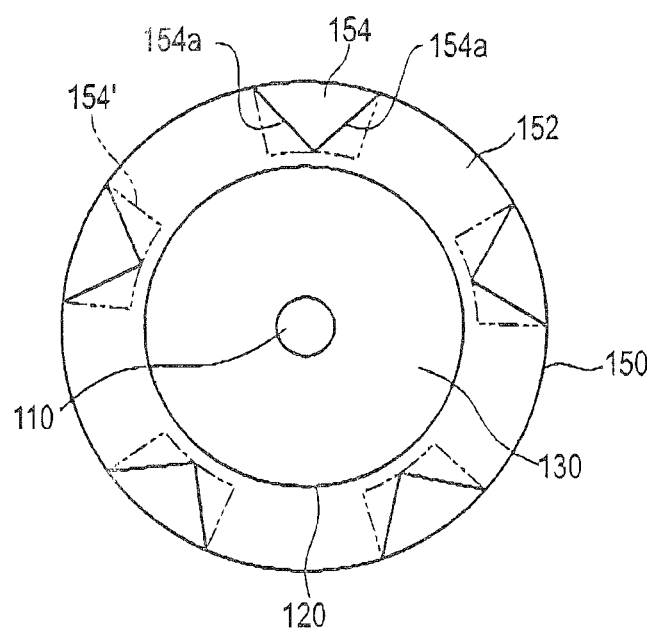
FIG. 3 is a front view of the optical device shown in FIG. 2 as viewed from the optical fiber side.
Figure 4:
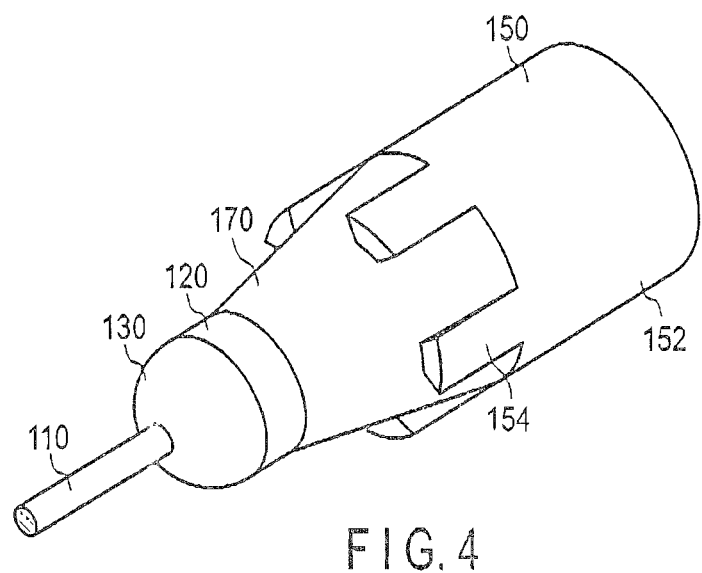
FIG. 4 is a perspective view of the optical device shown in FIG. 1 after being coated with an adhesive.
Figure 5:
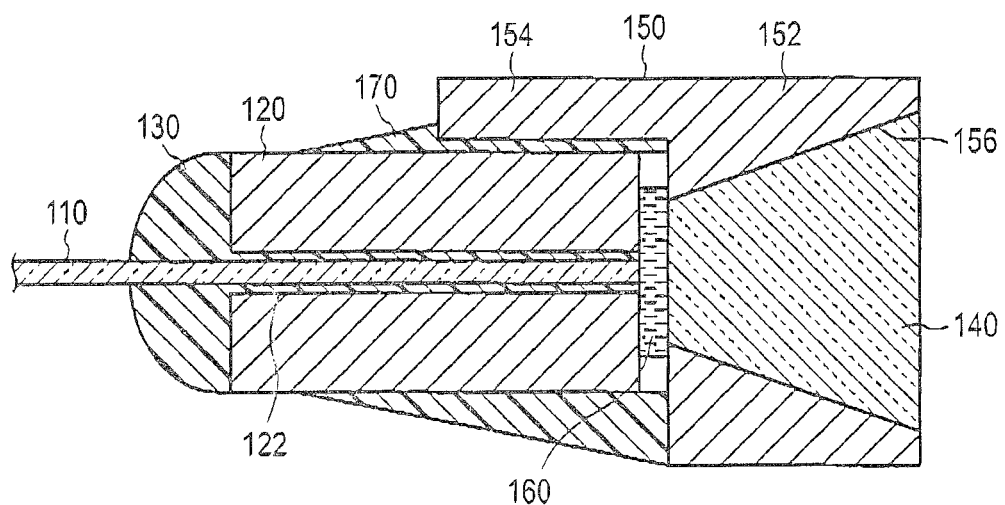
FIG. 5 is a longitudinal sectional view of the optical device shown in FIG. 4.

An optical device according to the first embodiment will be described with reference to FIGS. 1, 2, 3, 4, and 5. FIG. 1 is an exploded perspective view of the optical device according to this embodiment. FIG. 2 is a perspective view of the optical device shown in FIG. 1 before being coated with an adhesive. FIG. 3 is a front view of the optical device shown in FIG. 2 as viewed from the optical fiber side. FIG. 4 is a perspective view of the optical device shown in FIG. 1 after being coated with an adhesive. FIG. 5 is a longitudinal sectional view of the optical device shown in FIG. 4.

As shown in FIG. 1, an optical device 100 according to this embodiment includes an optical fiber 110 as a light guide member, a ferrule 120 as a holding member to hold the optical fiber 110, a phosphor 140 as an optical element to function according to light applied from the optical fiber 110, a holder 150 to hold the phosphor 140, and a UV adhesive 170 as a light curing adhesive to join the ferrule 120 and the holder 150 to each other.

The optical fiber 110, which has an end portion optically connected to a laser light source (not shown), is to guide laser light emitted from the laser light source. As shown in FIG. 5, the other end portion of the optical fiber 110 is inserted into an optical fiber insertion hole 122 extending through the ferrule 120, and the inner wall of the ferrule and the outer wall of the optical fiber are fixed to each other with a thermosetting adhesive 130. After the thermosetting adhesive 130 is cured, the phosphor-side end face of the ferrule 120 is polished, together with the optical fiber 110 and the thermosetting adhesive 130, so that the ferrule end face and the optical fiber end face are aligned.

The phosphor 140 receives laser light emerging from the optical fiber 110 to emit light having a wavelength different from that of the laser light. The phosphor 140 is inserted into a phosphor insertion hole 156 coaxially extending through a cylindrical holder body 152 and is fixed to the cylindrical holder body 152 with an adhesive (not shown). The inner wall of the phosphor insertion hole 156 is treated with a thin aluminum film or the like to reflect emitted light and scattered laser light from the phosphor 140. The shape of the phosphor insertion hole 156 is processed in conformity with the shape of the phosphor. FIG. 5 shows, as an example, a case in which the phosphor 140 has a truncated cone shape. The phosphor insertion hole 156 extends through the holder body 152. The end portion of the phosphor insertion hole 156 that is located on the ferrule 120 side serves as an opening which receives laser light emerging from the optical fiber 110.

The holder 150 has joint projections 154 projecting from the cylindrical holder body 152. The joint projections 154 have the same shape, each extend parallel to the central axis of the holder body 152. The sectional shape of each joint projection 154 on a plane perpendicular to the central axis of the holder body 152 is a generally sector shape. In this specification, a "generally sector shape" basically indicates a shape similar to a sector shape formed by connecting a point in a circle, not limiting to the center, to the two ends of an arc on the circumference. Assume also that a shape formed by connecting two points connected by a straight line or an arbitrary curve, instead of an arc, to another point is included in a "generally sector shape". That is, in this embodiment, each joint projection 154 is a columnar member whose sectional shape is similar to a sector shape, but may be a columnar member having another sectional shape like a triangular prism.

The joint projections 154 are arranged at the periphery of the holder body 152 around the central axis of the holder body 152 at equal angular intervals. In addition, the joint projections 154 point in the same radial direction from the central axis of the holder body 152. That is, the vertex of each generally sector shape (the angle defined by the two straight lines) points to the center.

In other words, the joint projections 154 are rotationally symmetrically arranged about the central axis of the holder body 152 as a whole. Where, that the projections are rotationally symmetrically arranged means that when they are rotated about a given axis through $360/n°$ (n is a natural number more than 1), the state after the rotation coincides with the state before the rotation. In a state in which the joint projections 154 are rotationally symmetrically arranged, typical points, e.g., the centers of gravity or innermost points, on cross-sections of the joint projections 154 on a plane perpendicular to the central axis of the holder body 152 are located on the same circumference.

A rotational symmetry in which a rotation of $360/n°$ makes the state after the rotation coincide with the state before the rotation is called an n-times rotational symmetry. In this embodiment, the joint projections 154 are in 5-times rotational symmetry about the central axis of the holder body 152. In other words, typical points, e.g., the centers of gravity, on cross-sections of the joint projections 154 on a plane perpendicular to the central axis of the holder body 152 are located at the vertexes of a regular pentagon.

In addition, in this embodiment, the holder body 152 has a cylindrical shape, and the rotational symmetry axis of the joint projections 154 coincides with the central axis of the holder body 152. However, the holder body 152 need not always have a cylindrical shape, and may have another arbitrary shape. In this case, the rotational symmetry axis of the joint projections 154 may shift from the central axis of the holder body 152.

As shown in FIG. 2, the ferrule 120 and the holder 150 are designed so that the cylindrical ferrule 120 is placed and engaged in the space among the joint projections 154. For this purpose, the inner diameter of the joint projections 154 is set to be larger than the diameter of the ferrule 120. Assume that in this case, the inner diameter of the joint projections 154 indicates the diameter of a cylindrical surface at which the points on the joint projections 154, arranged around the rotational symmetry axis, that are located nearest to the central axis.

With the ferrule 120 and the holder 150 being engaged with each other as shown in FIG. 2, the optical axis of the optical fiber 110 is aligned with the central axis of the holder body 152, and the phosphor 140 is placed on the optical axis of the optical fiber 110. In addition, the joint projections 154 are rotationally symmetrically arranged around the optical fiber 110.

As shown in FIG. 5, with the ferrule 120 and the holder 150 being engaged with each other, the joint projections 154 extend along a portion of the optical fiber 110 that is held by the ferrule 120. The joint projections 154 constitute a joint structure extending along the optical fiber 110. This joint structure forms a gap to allow the UV adhesive 170 to be easily injected between the ferrule 120 and the holder 150, so as to additionally provide joint surfaces for adhesion extending along the optical fiber 110. In this embodiment, the joint surfaces correspond to two inner side surfaces 154a of each joint projection 154.

Distal end faces 154b of the joint projections 154 may contribute to adhesion as well as the inner side surfaces 154a depending on how the UV adhesive 170 is applied. However, as the diameter of the overall optical device is reduced, the area of each distal end face 154b inevitably decreases, but the area of each inner side surface 154a can be adjusted to a necessary value by increasing the length of the joint projection 154. This enables to obtain a necessary joint strength. Obviously, the distal end faces 154b may be used for adhesion, even though they suffer some limitations due to a reduction in diameter.

As shown in FIG. 4, the UV adhesive 170 is injected into the gap formed between the ferrule 120 and the holder 150 by the joint projections 154 and cured to join the ferrule 120 and the holder 150.

When the UV adhesive 170 is cured, variations in internal forces in the device occur locally due to cure shrinkage force and stress relaxation after curing. This may cause a relative positional shift between the optical fiber 110 and the phosphor 140. The joint projections 154 rotationally symmetrically arranged around the ferrule 120 contribute to the suppression of the occurrence of a relative positional shift between the optical fiber 110 and the phosphor 140.

Curing the UV adhesive 170 is performed, for example, by irradiating it with UV light from the surrounding of the holder 150. As shown in FIG. 3, the sectional shape of each joint projection 154 on a plane perpendicular to the central axis of the holder 150, i.e., the rotational symmetry axis, is a generally sector shape. This shape allows the UV adhesive 170 to be irradiated with UV light from the surrounding of the holder 150 without interference by the joint projections 154.

Assume joint projections 154', as a comparative example, each of which has a sectional shape on a plane perpendicular to the rotational symmetry axis as the shape of part of a cylinder, i.e., a shape formed by connecting the two ends of each of two arcs having the same central angle and different diameters. In this comparative example, the UV adhesive 170 located between the inner circumferential surfaces of the joint projections 154' and the outer circumferential surface of the ferrule 120 has portions that cannot be irradiated with UV light because of interference by the joint projections 154'. Such portions of the UV adhesive 170 that are not irradiated with UV light cannot exert the inherent adhesive force.

In contrast to this, with the use of the joint projections 154, each of which has a sectional shape on a plane perpendicular to the rotational symmetry axis as a generally sector shape, the UV adhesive 170 located between the joint projections 154 and the ferrule 120 has no portions that cannot be irradiated with UV light due to interference by the joint projections 154. Accordingly, any part of the UV adhesive 170 can exert the inherent adhesive force.

A method of manufacturing the optical device 100 will be described next.

First of all, as described above, the optical fiber 110 is fixed to the ferrule 120 with the thermosetting adhesive 130. The thermosetting adhesive 130 in an unset state is poured into the optical fiber insertion hole 122 of the ferrule 120. The optical fiber 110 is then inserted into the optical fiber insertion hole 122 with the thermosetting adhesive 130 serving as a lubricant. After the thermosetting adhesive 130 is cured in an oven, end faces of the optical fiber 110 and the ferrule 120 are polished to remove the adhesive adhered to the optical fiber end portion, reduce the surface roughness of the optical fiber end portion, and align the ferrule end face with the optical fiber end face.

The step of inserting the phosphor 140 into the holder 150 will be described next. As the phosphor 140, a crystal having a desired phosphorescence function or a material obtained by molding a phosphorescent powder with a transparent resin or glass is processed into a desired shape in advance. The phosphor 140 is inserted into the holder 150 having the phosphor insertion hole 156 of the same shape as that of the outer shape of the phosphor, and a UV adhesive (not shown) is poured between the inner wall of the holder and the outer shape of the phosphor. Thereafter, UV light is applied to the adhesive to cure it, thereby fixing the phosphor to the holder 150. In this case, the method of fixing the phosphor 140 molded in advance to the holder 150 is used. However, a method of directly molding the phosphor 140 in the holder 150 may be used. For example, it is possible to fix the phosphor 140 in the holder 150 by pouring a liquid obtained by mixing a resin material before curing with a phosphorescent material into the phosphor insertion hole 156 of the holder 150 and curing the resin in an oven.

The ferrule 120 to which the optical fiber 110 is fixed is then aligned with the holder 150 to which the phosphor 140 is fixed. This operation aims at minimizing the amount of laser light lost by the positional shift between the optical fiber 110 and the phosphor 140 and allowing efficient phosphorescence. The alignment method used is generally called an active alignment method, which fixes the ferrule to the holder at a position where the amount of phosphorescence becomes maximum while actually applying laser light from the optical fiber 110 to the phosphor 140 and measuring the amount of phosphorescence. In order to use this alignment method, it is necessary to form a gap between the joint projections 154 of the holder 150 and the ferrule 120 within a moving range for alignment. Although it depends on the shape accuracies of the phosphor 140, holder 150, and ferrule 120, the operation range for alignment is about ±100 µm in this embodiment. That is, the diameter of the ferrule 120 and the inner diameter of a group of joint projections 154 need to have difference equal to or more than 200 µm. A refractive index matching material such as a matching grease 160 is placed between the optical fiber 110 and the phosphor 140 to improve the optical coupling efficiency.

After alignment, the UV adhesive 170 is applied to the outer surfaces of the joint projections 154 and is cured by irradiating the UV adhesive 170 with UV light from the surrounding of the holder 150. As the UV adhesive 170, an adhesive with minimum cure shrinkage is preferably used to prevent the relative positions of the optical fiber 110 and phosphor 140 from shifting at the time of curing. Operation using a dispenser or an inkjet scheme or manual operation may be used to apply the UV adhesive 170. When using any of these methods, the method used is preferably a method of applying only the UV adhesive 170 in a noncontact manner to the ferrule 120 and the holder 150 after alignment. When irradiating the UV adhesive 170 with UV light from the surrounding of the holder 150, it is preferable to use a method of applying UV light from many directions to prevent the UV adhesive 170 from having portions that no UV light reaches because of shadows produced by the joint projections 154.

The optical device 100 is completed through the above steps.

In the optical device 100 according to this embodiment, since the joint projections 154 additionally provide joint surfaces for adhesion extending along the optical fiber 110, it is possible to easily secure required joint strength even if the diameter of the overall device is reduced.

In addition, since the joint projections 154 are rotationally symmetrically arranged around the ferrule 120, the occurrence of a relative positional shift between the optical fiber 110 and the phosphor 140 is preferably suppressed when the UV adhesive 170 is cured.

Furthermore, since each joint projection 154 has a generally sector shape to allow the UV adhesive 170 to be irradiated with UV light from the surrounding of the holder 150 without interference by the joint projections 154, every portion of the UV adhesive 170 can exert the inherent adhesive force.

The optical device 100 according to this embodiment may be variously modified and changed.

For example, the number of joint projections 154 is five in this embodiment, but it is not limited to this and may be another arbitrary number. The joint projections 154 constituting the joint structure are only required to provide joint surfaces for adhesion extending along the optical fiber 110. In consideration of this purpose, the number of joint projections 154 may be one. In order to secure a large joint area for firm joining, the number of joint projections 154 is preferably two or more. Furthermore, the joint projections 154 are preferably arranged rotationally symmetrically to prevent the occurrence of a relative positional shift between the optical fiber 110 and the phosphor 140 when the UV adhesive 170 is cured.

In consideration of the purpose for additionally providing joint surfaces for adhesion extending along the optical fiber 110, a joint structure may take a form having a hole in the outer wall of the holder 150. However, in order to secure a large joint area, it is more preferable to use projection shapes like the joint projections 154.

Second Embodiment

Figure 6:
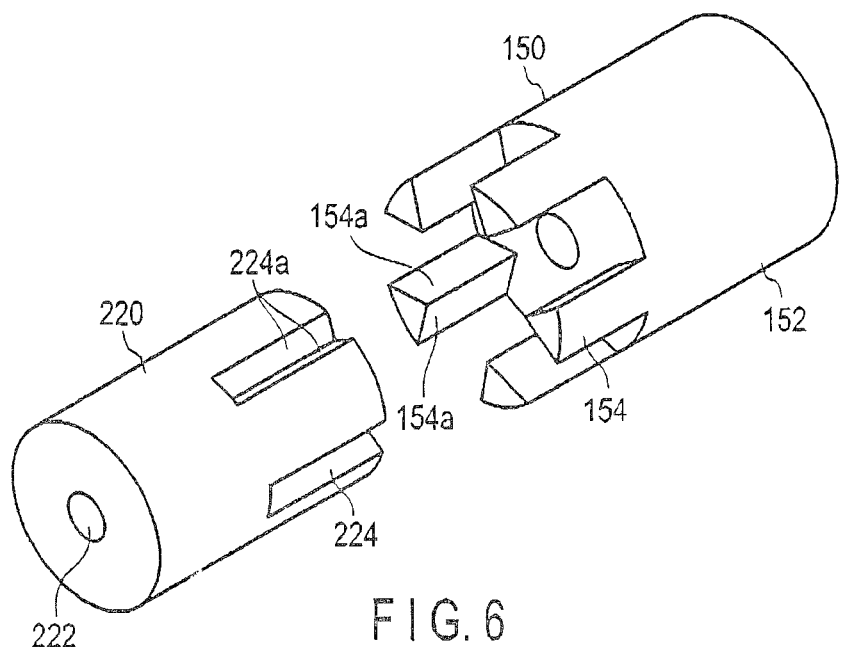
FIG. 6 is a perspective view of the ferrule and holder of an optical device according to the second embodiment.
Figure 7:
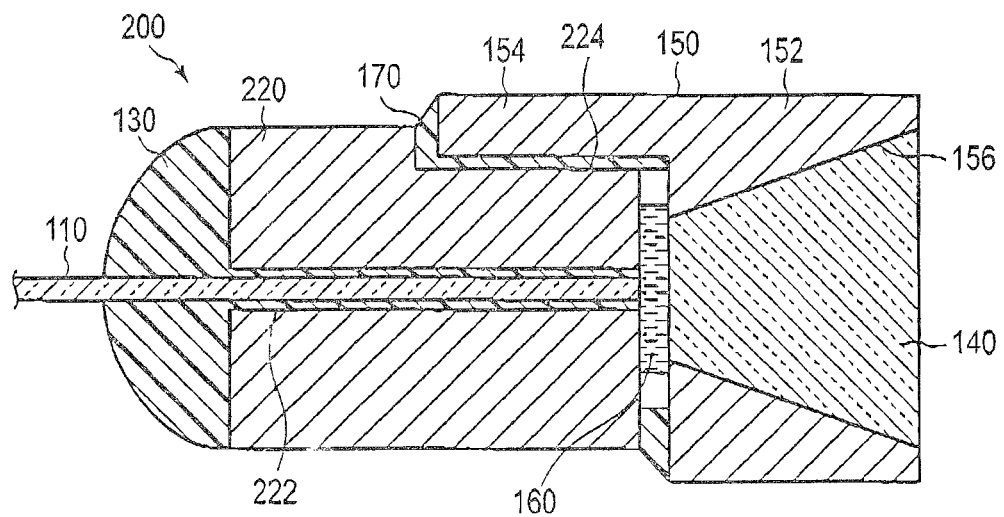
FIG. 7 is a longitudinal sectional view of the optical device according to the second embodiment.

An optical device according to the second embodiment will be described with reference to FIGS. 6 and 7. This embodiment is directed to another ferrule that may be used in place of the ferrule according to the first embodiment. FIG. 6 is a perspective view of a ferrule and a holder in the optical device according to the second embodiment. FIG. 7 is a longitudinal sectional view of the optical device according to this embodiment. The same reference numerals as in FIGS. 1, 2, 3, 4, and 5 denote the same members in FIGS. 6 and 7, and a detailed description of them will be omitted.

As shown in FIGS. 6 and 7, an optical device 200 according to this embodiment has the same arrangement as that of the optical device 100 according to the first embodiment except for a ferrule 220. The ferrule 220 has an optical fiber insertion hole 222 extending through it, and an optical fiber 110 is fixed to the ferrule 220 by the same method as that in the first embodiment. The ferrule 220 also has joint grooves 224 in the outer circumferential surface of its end portion on the holder 150 side. The joint grooves 224 extend along a portion of the optical fiber 110 that is fixed to the ferrule 220. The joint grooves 224 increase the joint area as compared with a structure without the joint grooves 224.

The ferrule 220 and the holder 150 are designed so that the joint grooves 224 and the joint projections 154 face and are engaged with each other so as to leave spaces between them, respectively. To this end, the joint grooves 224 are equal in number to the joint projections 154, and rotationally symmetrically arranged around the optical fiber 110.

The smaller the space between the joint grooves 224 and the joint projections 154, the better in terms of reducing the diameter of the overall device. However, as described in the first embodiment, the space is set in consideration of the optical axis shifts of the ferrule 220 and holder 150 for the sake of active alignment before joining of the ferrule 220 and holder 150.

With the ferrule 220 and the holder 150 being engaged with each other, the optical axis of the optical fiber 110 is aligned with the central axis of a holder body 152, and a phosphor 140 is placed on the optical axis of the optical fiber 110.

In this embodiment, the joint grooves 224 and the joint projections 154 constitute a joint structure extending along the optical fiber 110. This joint structure forms a gap to allow the adhesive to be easily injected between the ferrule 220 and the holder 150, so as to additionally provide joint surfaces for adhesion extending along the optical fiber 110. Two inner side surfaces 154a of each joint projection 154 and two side surfaces 224a of each joint groove 224, which face them, correspond to the joint surfaces for adhesion extending along the optical fiber 110.

The optical device 200 according to this embodiment has the same merits as those of the optical device 100 according to the first embodiment.

In addition, since the joint projections 154 additionally provide the joint surfaces for adhesion extending along the optical fiber 110, and the joint grooves 224 also additionally provide joint surfaces for adhesion extending along the optical fiber 110, in other words, the joint grooves 224 increase the joint area, it is easy to secure required joint strength. Furthermore, since the joint grooves 224 and the joint projections 154 are arranged to face each other so as to leave a space between them, the layer of the UV adhesive 170 decreases in thickness, and the rigidity of the overall joint structure increases.

Third Embodiment

Figure 8:
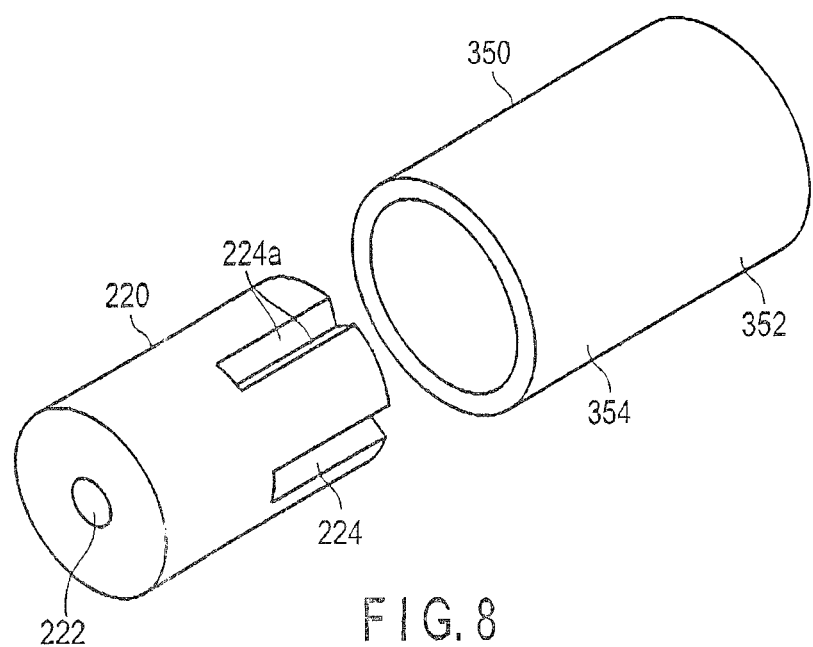
FIG. 8 is a perspective view of the ferrule and holder of an optical device according to the third embodiment.
Figure 9:
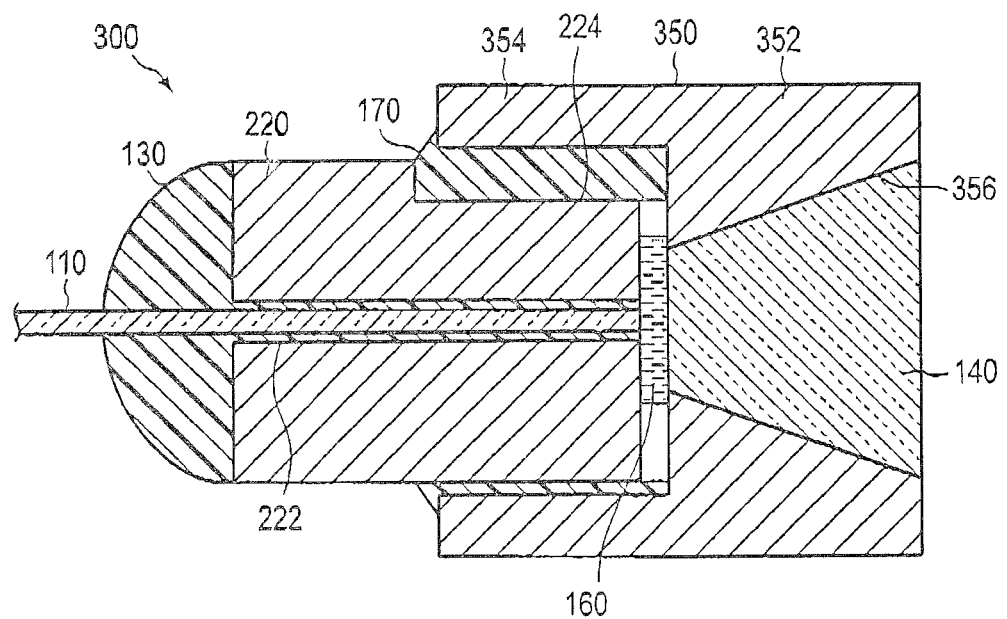
FIG. 9 is a longitudinal sectional view of the optical device according to the third embodiment.

An optical device according to the third embodiment will be described with reference to FIGS. 8 and 9. This embodiment is directed to another holder that may be used in place of the holder in the second embodiment. FIG. 8 is a perspective view of a ferrule and a holder in an optical device according to the third embodiment. FIG. 9 is a longitudinal sectional view of the optical device according to this embodiment. The same reference numerals as in FIGS. 1, 2, 3, 4, 5, 6, and 7 denote the same members in FIGS. 8 and 9, and a detailed description of them will be omitted.

As shown in FIGS. 8 and 9, an optical device 300 according to this embodiment has the same arrangement as that of the optical device 200 according to the second embodiment except for a holder 350. The holder 350 has a phosphor insertion hole 356 coaxially extending through a cylindrical holder body 352, and a phosphor 140 is fixed to the holder 350 by the same method as that in the first embodiment. The holder 350 also has a joint cylinder 354 protruding from the holder body 352. The joint cylinder 354 is placed coaxially with the central axis of the holder body 352.

A ferrule 220 and the holder 350 are designed so that an end portion of the ferrule 220 is inserted and engaged in the joint cylinder 354. To this end, the inner diameter of the joint cylinder 354 is set to be larger than the outer diameter of the ferrule 220.

The smaller the gap between the ferrule 220 and the joint cylinder 354, the better in terms of reducing the diameter of the overall device. As described in the first embodiment, however, the gap is set in consideration of the optical axis shifts of the ferrule 220 and holder 350 for the sake of active alignment before joining of the ferrule 220 and holder 350.

With the ferrule 220 and the holder 350 being engaged with each other, the optical axis of an optical fiber 110 is aligned with the central axis of the holder body 352, and the phosphor 140 is placed on the optical axis of the optical fiber 110.

In this embodiment, joint grooves 224 constitute a joint structure extending along the optical fiber 110. This joint structure forms a gap to allow the adhesive to be easily injected between the ferrule 220 and the holder 350, so as to additionally provide joint surfaces for adhesion extending along the optical fiber 110. Two side surfaces 224a of each joint groove 224 correspond to the joint surfaces for adhesion extending along the optical fiber 110.

The optical device 300 according to this embodiment has the same merits as those of the optical device 100 according to the first embodiment.

The holder 350 according to this embodiment is superior in workability to the holder 150 according to the first embodiment. More specifically, when manufacturing the holder 150, a holder base material is hollowed out except for an outer circumferential portion to be formed into joint projections 154, and the left outer circumferential portion is notched. In this notching process, since thin joint projections are low in rigidity, it is necessary to use an accurate low-damage process such as laser machining or an ultra-low speed cutting process. However, as in this embodiment, the holder 350 is manufactured by only hollowing out a holder base material except for the outer circumferential portion serving as the joint cylinder 354, and hence it is possible to use a general process method.

In this embodiment, like the joint projections 154 in the first embodiment, the number of joint grooves 224 may be arbitrarily changed. Although the number of joint grooves 224 may be one, the number of them is preferably two or more. In addition, they are preferably arranged rotationally symmetrically.

Although the embodiments of the present invention have been described with reference to the views of the accompanying drawing, the present invention is not limited to these embodiments. The embodiments may be variously modified and changed within the spirit and scope of the invention.

For example, although each embodiment described above has exemplified the case in which the holder has the joint projections or the joint cylinder assuming that the outer diameter of the holder is larger than the outer diameter of the ferrule, in contrast to this, each embodiment may be configured such that the outer diameter of the ferrule is larger than the outer diameter of the holder, and the ferrule has joint projections or a joint cylinder.

What is claimed is:

1. An optical device comprising:
a light guide member;
a holding member to hold the light guide member;

an optical element to function according to light applied from the light guide member;

a holder to hold the optical element; and an adhesive to join the holding member and the holder to each other, the holding member and the holder being engaged with each other so that the optical element is placed on an optical axis of the light guide member, at least one of the holding member and the holder having a joint structure extending along the light guide member, the joint structure forming a gap to allow the adhesive to be injected between the holding member and the holder, the holding member and the holder being joined to each other with the adhesive injected into the gap, wherein the holder has joint projections forming the joint structure;

the adhesive comprises a light curing adhesive, each of the joint projections having a shape that allows light to be applied to the adhesive from surrounding of the holder without interference by the joint projections; and a sectional shape of each of the joint projections is a generally sector shape.

2. The device according to claim 1, wherein the holding member has at least one joint groove and the joint groove constitutes the joint structure together with the joint projection.

3. The device according to claim 2, wherein the joint projection and the joint groove face each other so as to leave a space between the joint projection and the joint groove.

4. The device according to claim 1, wherein each of the joint projections have the same shape.

5. An optical device comprising:

a light guide member;

a holding member to hold the light guide member;

an optical element to function according to light applied from the light guide member;

a holder to hold the optical element; and an adhesive to join the holding member and the holder to each other, the holding member and the holder being engaged with each other so that the optical element is placed on an optical axis of the light guide member, at least one of the holding member and the holder having a joint structure extending along the light guide member, the joint structure forming a gap to allow the adhesive to be injected between the holding member and the holder, the holding member and the holder being joined to each other with the adhesive injected into the gap, wherein the holder has joint projections and the joint projections are rotationally symmetrically arranged around the light guide member;

the adhesive comprises a light curing adhesive, each of the joint projections having a shape that allows light to be applied to the adhesive from surrounding of the holder without interference by the joint projections; and a sectional shape of each of the joint projections is a generally sector shape.

6. The device according to claim 5, wherein the sectional shape of each of the joint projections is on a plane perpendicular to a rotational symmetry axis.

7. The device according to claim 6, wherein the holding member has joint grooves and the joint grooves constitute the joint structure together with the joint projections.

8. The device according to claim 7, wherein the joint projections and the joint grooves face each other so as to leave spaces between the joint projections and the joint grooves, respectively.

9. The device according to claim 8, wherein the holding member has at least one joint groove and the joint groove constitutes the joint structure together with the joint projection.

10. The device according to claim 9, wherein the joint projection and the joint groove face each other so as to leave a space between the joint projection and the joint groove.

11. The device according to claim 5, wherein the holding member has joint grooves and the joint grooves constitute the joint structure together with the joint projections.

12. The device according to claim 11, wherein the joint projections and the joint grooves face each other so as to leave spaces between the joint projections and the joint grooves, respectively.

* * * * *